Dec. 24, 1935.   J. L. ANDERSON ET AL   2,025,082
TEMPLATE CONTROLLED APPARATUS
Filed Sept. 27, 1934   2 Sheets-Sheet 2
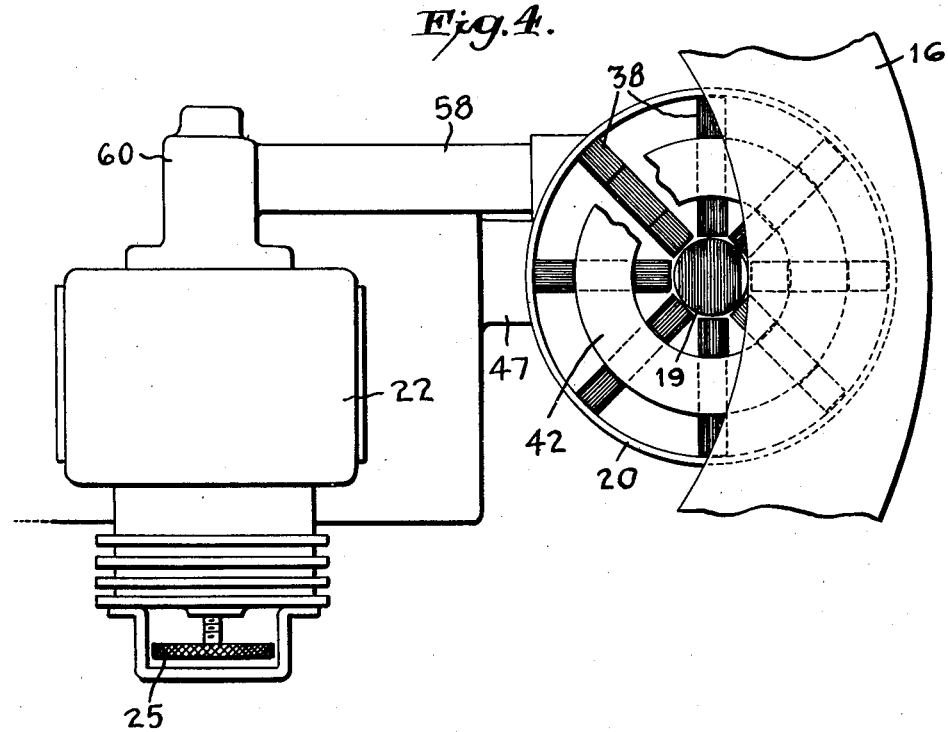
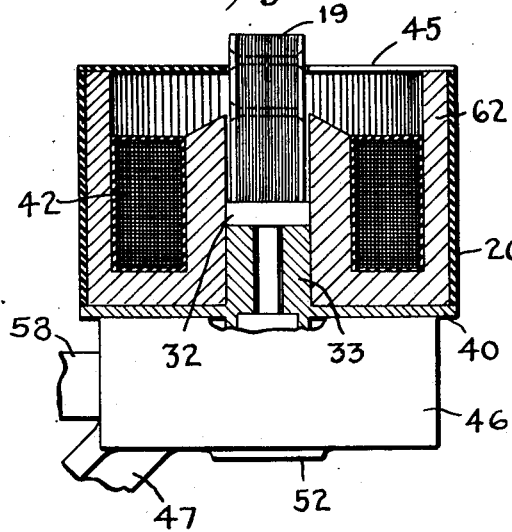
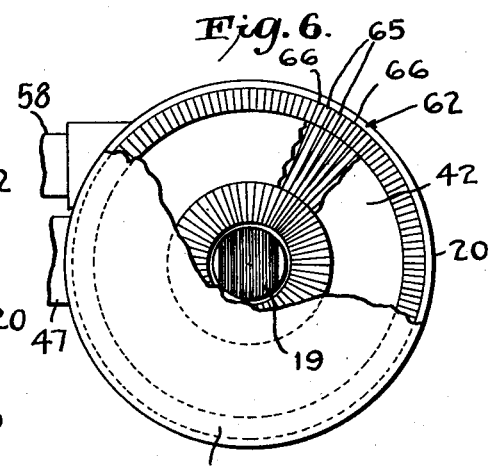

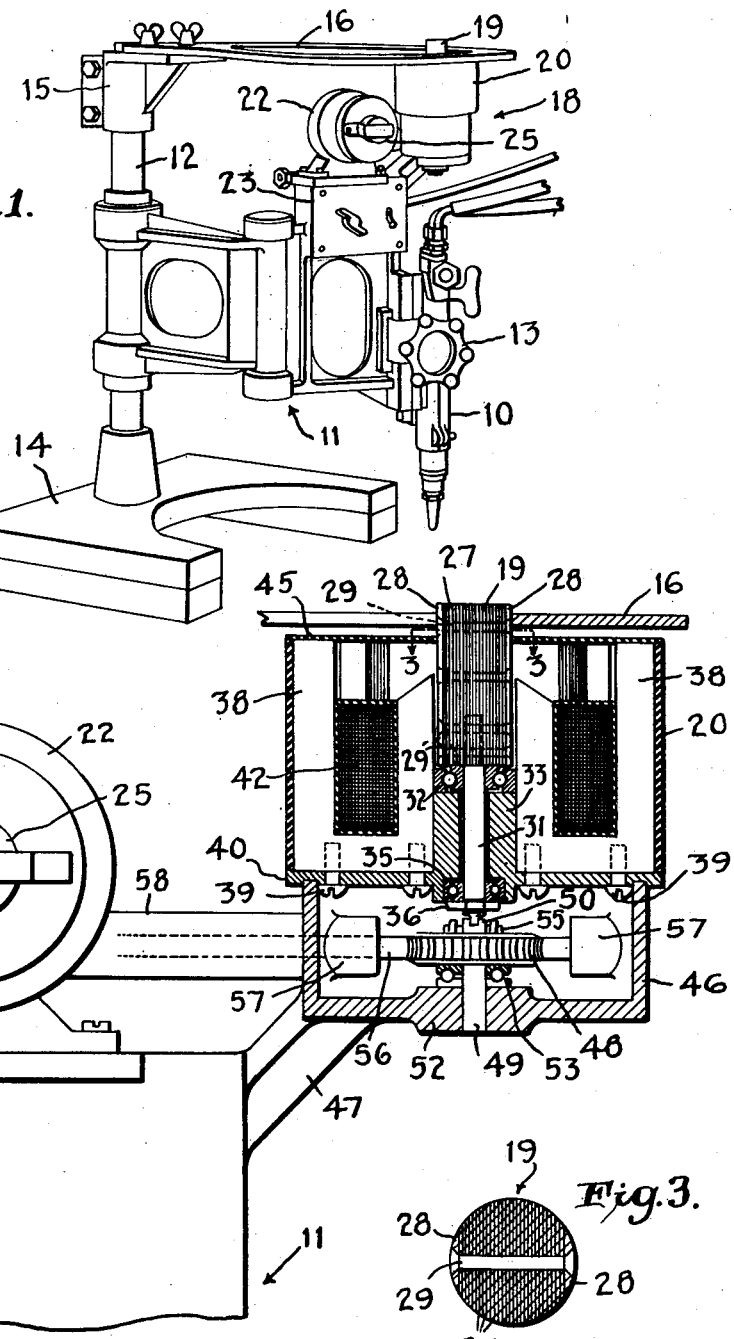
Dec. 24, 1935.     J. L. ANDERSON ET AL     2,025,082
TEMPLATE CONTROLLED APPARATUS
Filed Sept. 27, 1934     2 Sheets-Sheet 1

Patented Dec. 24, 1935

2,025,082

UNITED STATES PATENT OFFICE 2,025,082

TEMPLATE-CONTROLLED APPARATUS

James L. Anderson, Closter, and Charles T. Evans, Jersey City, N. J., assignors to Air Reduction Company, Incorporated, New York, N. Y., a corporation of New York Application September 27, 1934, Serial No. 745,762

13 Claims. (Cl. 33—23)

This invention relates to template-controlled apparatus operated by a driven template follower which is held by magnetic force against the edge of a template. Such magnetic template-followers are used extensively for moving torch-carrying frames of universal cutting machines, and may be used for welding or cutting by torch or electrically as well as for other purposes.

Known magnetic template-follower devices have required direct current, though the current most usually available is alternating. It has not been conveniently practicable or commercially possible to obtain enough traction for the machines by the use, directly, of alternating current. Therefore, wherever shops have had alternating current it has been the practice to install motor-generator sets to take the alternating current and give direct current to the coils of the follower magnets, since without sufficient traction slippage of the template rollers makes it impossible to secure a uniform or definite speed of drive, or results in stopping at some point in the contour of the template. In production operations, such as the cutting of metal to pattern, substantial evenness and continuity of movement are essential.

It is an object of this invention to provide an electromagnetic template-follower which will successfully move the mechanism operated by the follower and develop the necessary traction on alternating current, and which will not become excessively heated. In the many localities where alternating current is the only commercially available power, this invention saves the expense of special equipment for providing direct current for the follower magnets.

Another advantage of the invention is that the electromagnet or magnets of the template-follower and also the motor that drives the follower through its course may both be operated from the same line. When the former direct-current-magnet template-followers were used in shops having alternating current, good results required that the follower motors be supplied with current from the power or lighting circuit while the magnets were energized from a motor-generator set or other source of direct current.

The features of the invention will appear as the specification proceeds.

In the accompanying drawings, forming part hereof:

Fig. 1 is a perspective view of a universal torch cutting machine equipped with a template-follower embodying the invention;

Fig. 2 is an enlarged detail view of the template-follower shown in Fig. 1, with most of the structure shown in section;

Fig. 3 is a section on the line 3—3 of Fig. 2;

Fig. 4 is a top plan view of the structure shown in Fig. 2, with the magnet cover removed and the coil partly broken away;

Fig. 5 is a side view, mostly in section, showing a modified form of the invention; and Fig. 6 is a top plan view of the structure shown in Fig. 5 with the cover and coil partly broken away.

The universal torch cutting machine shown in Fig. 1 is merely illustrative of any suitable form of universal motion, or motion-producing apparatus, of which various kinds are known. This invention is applicable to widely different types of such apparatus.

A cutting torch 10 is supported for universal movement in a plane by a jointed arm 11 which swings on a column 12. The torch is connected to the jointed arm by a torch holder of conventional design with a hand-wheel 13 for moving the torch vertically to obtain the desired spacing between the torch tip and the work.

The column 12 has a heavy base 14 at its lower end. A bracket 15 is clamped on the top of the column and supports a template 16 in a plane parallel to the plane of movement of the torch. A template-follower 18 has a driven or traction roller 19 which contacts with the template and is located in vertical alinement with the torch. The traction which this roller secures on the template is obtained by magnetism induced by alternating current, preferably with magnetization of the roller itself. The means for accomplishing this is enclosed in a casing 20. The roller is rotated, to cause it to travel along the edge of the template, by driving mechanism including an electric motor 22 which is fastened to the top of a control panel 23 on the torch-supporting link of the jointed arm. The motor is of the governor-controlled type preferably used in the cutting machine art for driving tracers and template-followers at uniform speed, and its governor may be adjusted by a knob 25 to change the rate of movement of the template-follower and of the torch or other instrumentality controlled thereby.

The construction of the roller is shown in Figs. 2 and 3. The roller is made of thin laminations 27 extending parallel to the axis of the roller and retained between arcuate plates 28 by rivets 29. The laminations are insulated from one another to provent the roller from becoming highly heated by induced eddy currents. Surface oxide on the sheet metal from which the laminations are made usually provides sufficient insulation.

An economical way of making the roller, which gives good results, is to assemble laminations and plates of substantially rectangular cross-section, and after they are riveted together turn down the assembly to an accurate cylindrical form. The roller can be made with radial laminations, but such a construction is more expensive to manufacture.

A shaft 31 extends into the lower end of the roller 19 and has a shoulder in contact with the bottom face of the roller. The shaft 31 has a ball-bearing 32. The outer race of this ball-bearing rests on a hub 33 and the inner race contacts with the lower end of the roller so that the ball-bearing 32 also serves as a thrust bearing for supporting the roller 19.

A ball-bearing 35 at the lower end of the shaft 31 fits within a recess in the lower face of the hub 33. A nut 36 threaded on the lower end of the shaft 31 prevents the shaft 31 from being lifted out of the bearings.

A number of horseshoe-type magnet elements 38 surround the lower part of the roller 19 and are connected by screws 39 to a flange 40 extending from the hub 33. As shown in the drawings, the magnet elements 38 are energized by a common annular coil 42 which is connected with a source of alternating current power and may be wound for operation on the same voltage as the motor and in a parallel circuit with the motor.

The inner poles of the magnet elements 38 are located close to the roller 19 so that there is only a small air gap to be crossed by the magnetic flux in passing from the magnets to the roller, and the roller is a magnetic pole of the template-follower. The air gaps in the magnetic circuit can be bridged with wire brushes if desired. The magnet elements 38 extend from all sides of the roller 19 and are sufficiently close together so that the template is always in the magnetic circuit of at least one magnet element no matter which side of the roller the template may be on. The inner poles of the magnet elements terminate well below the level of the template so that the flux from these poles passes through the roller rather than across the long air gap between the inner poles and the template. The magnetic circuit of the tracer is from the inner poles of the magnet elements, through the roller to the template, through the template, and across the short air gap between the template and the outer poles of the magnet elements under the template. The slope of the inner pole faces concentrates the flux in the roller.

The magnet elements 38 and their coil 42 are covered by a plate 45 of amyl acetate, or other non-magnetic material, with a central opening through which the roller 19 extends. The flange 40 is supported by and connected with a gear housing 46 at the outer end of a bracket 47 which extends from the jointed arm 11.

A worm-wheel 48 is secured to a shaft 49 which has a tongue and groove coupling 50 with the roller shaft 31. The shaft 49 has a bearing in a central boss 52 in the bottom of the gear casing and the shaft 49 and worm-wheel 48 are held against axial movement by a ball-bearing thrust washer 53.

The worm-wheel 48 is driven by a worm 55 on a shaft 56 journaled in lugs 57 on the side wall of the gear housing 46. The shaft 56 extends through a shaft housing 58 to a reduction gear unit 60 (Fig. 4) at one end of the motor 22. The motor drives the shaft 56 through this reduction gear unit 60 and the speed is still further reduced by the worm gearing through which the rotation of the shaft 56 is transmitted to the vertical shaft 49.

A modification of the invention is shown in Figs. 5 and 6. A single annular magnet 62 takes the place of the horseshoe magnet elements 38 shown in Figs. 2 and 3. This annular magnet 62 is laminated and the radial dimension of the outer pole face is less than that of the inner pole face so that the cross-sectional areas of the two pole faces are substantially equal in spite of their difference in circumference.

If the sides of the laminations of the magnet 62 are radial planes, the thickness of the laminations at the outer circumference of the magnet is somewhat greater than desirable. In order to have thin laminations and thus reduce the heating of the magnet, the laminations 65 which extend the full width of the magnet are shaped so that the side faces of each lamination are radial planes up to the point where the lamination reaches a maximum desirable thickness. From this point to the outer circumference of the magnet the side faces of these laminations 65 are parallel, and the space between the outer portions of these laminations 65 are filled in by short sector laminations 66, as shown in Fig. 6.

The laminations of the magnet 62 are preferably connected by vitreous cement, the laminations being heated and vitrefied into a unit when manufactured.

The preferred embodiment and one modified form of the invention have been described, but other changes and modifications can be made, and various features of the invention may be used without others. Although shown and described as the means for moving the torch of a universal cutting machine, it will be apparent that the invention can be used for operating welding machines or other apparatus.

We claim:
1. The combination of a torch-carrying frame affording universal movement in a plane, a driven rotary means comprising a roller to cooperate with a template, and a plurality of alternating-current electromagnetic means disposed about said rotary means and so spaced that the roller and template are in the magnetic circuit of at least one of said electromagnetic means when any point around the circumference of the roller is in contact with the template.

2. A follower for template-controlled apparatus including a driven rotary means comprising a roller to cooperate with a template, and alternating-current electromagnetic means comprising a plurality of elements disposed about said rotary means and so spaced that the roller and template are in the concentrated magnetic circuit with at least one of said elements when the roller is in contact with any point along the edge of the template.

3. A follower for template-controlled apparatus comprising a roller magnet pole for contact with a template, a plurality of alternating-current magnet poles in planes extending radially from the axis of the roller, each of said magnet poles extending close to the roller and to the template when the roller is following a template during the operation of the apparatus.

4. A follower for template-controlled apparatus comprising a roller for contact with a template, alternating-current electromagnetic means for magnetizing the roller, said means including a plurality of magnet elements in planes extending radially from the axis of the roller, each of said magnet elements having a short pole extending close to the roller and a long pole which extends close to the template, thus concentrating the field when the roller is following a template during the operation of the apparatus.

5. A magnetic template follower for alternating-current power comprising a roller for contact with the template, means for driving the roller including a motor, means for establishing a magnetic circuit through the roller and template including a plurality of laminated magnet poles at spaced points around the roller, and windings for magnetizing said magnet poles.

6. A magnetic template-follower, including a plurality of magnet poles spaced around the circumference of a circle, and an energized laminated roller supported for rotation in the circle of magnet poles and having its peripheral surface adjacent the magnet poles, said roller having a portion extending beyond the magnet poles for contact with a template, and fastening means holding said laminations together to form an integral roller.

7. In apparatus of the class described, a template-following roller formed of laminations which extend parallel to the axis of rotation of the roller, an alternating-current magnet for magnetizing said roller, and mechanism for rotating the roller to cause it to travel along the template.

8. In apparatus of the class described, a template-following roller comprising a pack of thin laminations electrically insulated from each other and lying in planes parallel to the axis of rotation of the roller, thin plates of segmental cross-section on opposite sides of the pack of laminations, and fastening means connecting said plates and holding the laminations and plates assembled in a relation which forms a cylindrical roller.

9. A magnetic template-follower for operation with alternating current having a laminated roller for contact with the template, laminated magnet core means for causing the roller to adhere to the template, said magnet core means being constructed and arranged so that one pole face is in the proximity of the roller and the other pole face is in a position close to the template when the follower is in use, and windings for energizing said core means.

10. In apparatus of the class described, a laminated roller for contact with a template, a drive shaft connected to the lower end of the roller, a motor operatively connected with the drive shaft, an alternating-current magnet including a laminated core with its inner side extending along the lower part of the roller and close to said roller so that the roller rotates in and forms a part of the magnetic circuit of said magnet, and the outer side terminating close to the bottom face of the template so that at least a part of said template also forms a part of the magnetic circuit.

11. In apparatus of the class described, a magnet including a laminated annular core of horseshoe-like cross-section, a laminated circuit-completing roller for contact with a template, a portion of said roller extending into the center opening through said core to serve as a path for the magnetic flux, the outer pole face of the core being close to the plane of the template when the apparatus is in operation.

12. A template-follower comprising a roller for contacting with the edge of a template, and alternating current electromagnetic means for holding the roller against the template, including a plurality of laminated magnet elements so located with respect to the roller that at least one of said magnet elements extends inward from the edge of the template when the roller is in contact with any point on the template.

13. A magnetic template-follower for alternating-current power having a roller for contact with a template, mechanism for rotating the roller to cause it to travel along the edge of the template, and means for causing a strong magnetic attraction between the template-follower and template including an annular laminated core with its central pole face close to the roller and at least a portion of the other pole face in a position close to the template back from the edge of the template, and windings for magnetizing said laminated core.

JAMES L. ANDERSON.
CHARLES T. EVANS.